United States Patent
Tooyama et al.

(10) Patent No.: US 10,525,812 B2
(45) Date of Patent: *Jan. 7, 2020

(54) ACTIVE VIBRATION DAMPING DEVICE

(71) Applicant: HONDA MOTOR CO., LTD, Minato-ku, Tokyo (JP)

(72) Inventors: Takashi Tooyama, Wako (JP); Takashi Yamaguchi, Wako (JP); Tatsuhiro Yone, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 110 days.

This patent is subject to a terminal disclaimer.

(21) Appl. No.: 15/712,612

(22) Filed: Sep. 22, 2017

(65) Prior Publication Data

US 2018/0086196 A1 Mar. 29, 2018

(30) Foreign Application Priority Data

Sep. 28, 2016 (JP) .................................. 2016-189110

(51) Int. Cl.
*B60K 5/12* (2006.01)
*F16F 15/00* (2006.01)

(52) U.S. Cl.
CPC .......... *B60K 5/1283* (2013.01); *F16F 15/002* (2013.01); *F16F 2230/18* (2013.01)

(58) Field of Classification Search
CPC .... B60K 5/1283; F16F 15/002; F16F 2230/18
See application file for complete search history.

(56) References Cited

U.S. PATENT DOCUMENTS

| | | | | |
|---|---|---|---|---|
| 5,141,202 A | * | 8/1992 | Tobias | B60K 5/12 248/550 |
| 5,310,017 A | * | 5/1994 | Tobias | B60G 13/14 180/291 |
| 5,639,073 A | * | 6/1997 | Suzuki | F16F 13/26 267/140.13 |
| 5,769,402 A | * | 6/1998 | Ide | F16F 13/264 267/140.14 |
| 5,905,317 A | * | 5/1999 | Aoki | F16F 13/22 267/140.14 |
| 6,254,069 B1 | * | 7/2001 | Muramatsu | F16F 13/264 248/550 |
| 2001/0032919 A1 | * | 10/2001 | Hagino | F16F 13/264 248/562 |
| 2005/0003925 A1 | * | 1/2005 | Wakashiro | B60K 6/485 477/2 |
| 2005/0003927 A1 | * | 1/2005 | Asakawa | B60K 6/485 477/3 |

(Continued)

FOREIGN PATENT DOCUMENTS

| JP | 04-095633 | 3/1992 |
|---|---|---|
| JP | 2007-107579 | 4/2007 |

*Primary Examiner* — Mussa A Shaawat
(74) *Attorney, Agent, or Firm* — Amin, Turocy & Watson, LLP

(57) ABSTRACT

Normally, a phase fixed control is executed. In the event that a vibration value VAPP of an engine becomes greater than or equal to a predetermined vibration value VAPP_th, a first phase of an active vibration generated by a first actuator and a second phase of an active vibration generated by a second actuator are changed in mutually opposite directions.

5 Claims, 7 Drawing Sheets

(56) References Cited

U.S. PATENT DOCUMENTS

| | | | |
|---|---|---|---|
| 2005/0003928 A1* | 1/2005 | Niki | B60K 6/48 |
| | | | 477/5 |
| 2005/0038576 A1* | 2/2005 | Hara | B60K 6/48 |
| | | | 701/22 |
| 2005/0140075 A1* | 6/2005 | Mishima | F01N 13/14 |
| | | | 267/140.11 |
| 2018/0147933 A1* | 5/2018 | Fukami | F01N 5/02 |

* cited by examiner

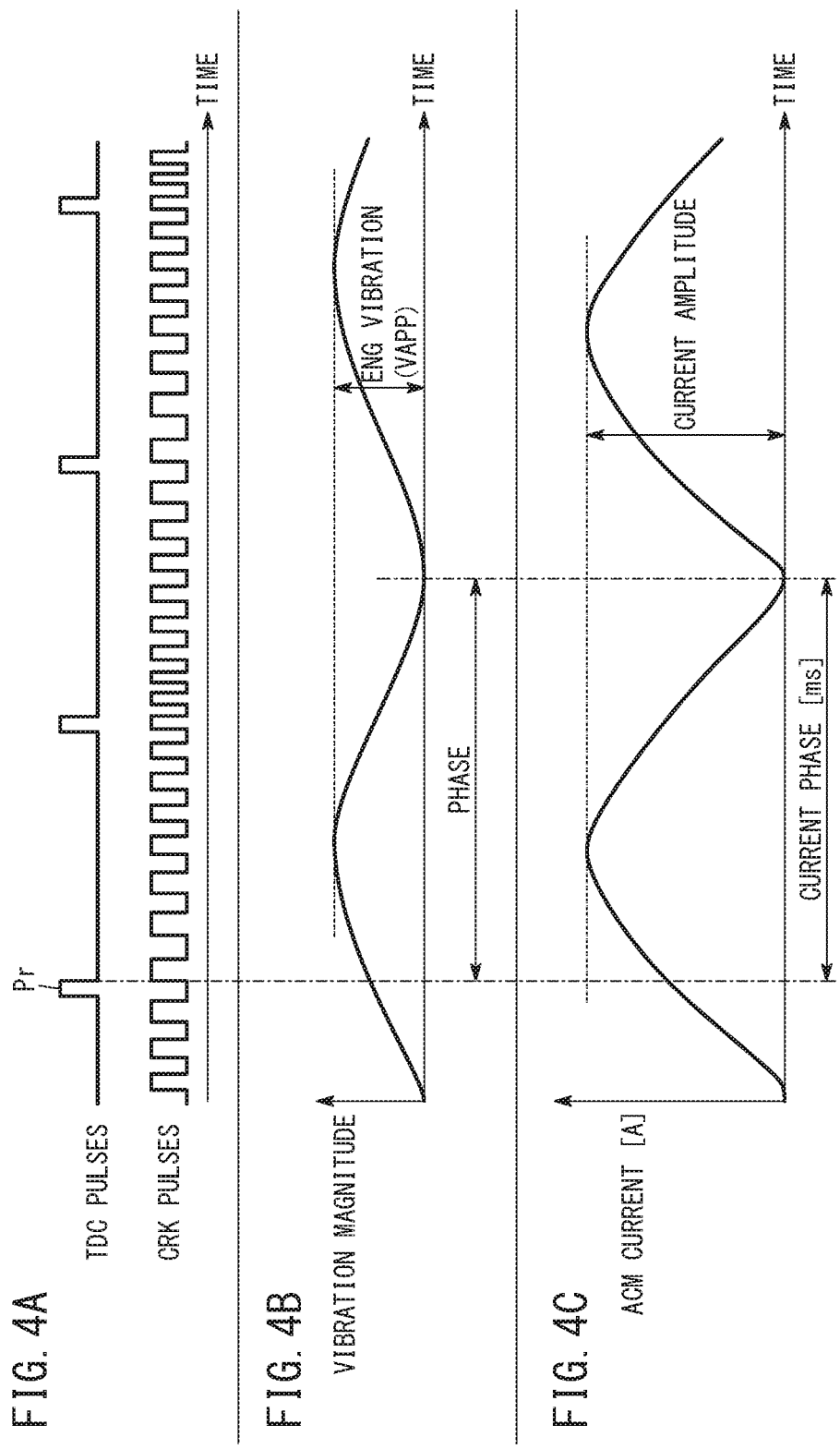

ACTIVE VIBRATION DAMPING DEVICE

CROSS-REFERENCE TO RELATED APPLICATION

This application is based upon and claims the benefit of priority from Japanese Patent Application No. 2016-189110 filed on Sep. 28, 2016, the contents of which are incorporated herein by reference.

BACKGROUND OF THE INVENTION

Field of the Invention

The present invention relates to an active vibration damping device equipped with an engine mount interposed between a vehicle body and a multi-cylinder internal combustion engine mounted in the vehicle, and which is adapted to suppress vibrations transmitted from a side of the internal combustion engine to a side of the vehicle body, by active vibrations generated by actuators of the engine mount.

Description of the Related Art

Vibrations generated in an internal combustion engine (hereinafter also referred to as an "engine") propagate to the vehicle cabin through (a sub-frame and/or a main frame of) the vehicle body. As pathways of the vibrations that are propagated from the engine to the vehicle cabin, there are generally cited a pathway (hereinafter referred to as a "mounting system path") in which vibrations are propagated from the engine to the vehicle body via the engine mount, and a pathway (hereinafter referred to as a "drive system path") in which vibrations are propagated from an output shaft of the engine, through a suspension or the like, and to the vehicle body.

A vibration damping device is provided in the vehicle in order to suppress vibrations that are propagated through the mounting system path. As such a vibration damping device, a liquid sealed mount comprising a liquid chamber filled with a liquid, and an active control mount (hereinafter referred to as an "ACM") in which a liquid sealed mount and an actuator are provided in an integrated manner, etc., are known. In the present specification, devices related to vibration damping, such as an ACM and a control device therefor (ACM-ECU) or the like, are referred to collectively as active vibration damping devices.

In Japanese Laid-Open Patent Publication No. 04-095633, a technique is disclosed for controlling an ACM on the basis of temperature. According to this technique, even if there is a change in the spring constant of the engine mount due to a change in temperature, and the amplitude and phase of vibrations propagated to the vehicle body are changed thereby, by controlling the ACM on the basis of the temperature, vibrations that propagate to the vehicle body can be canceled out.

SUMMARY OF THE INVENTION

A change in temperature of the vehicle exerts an influence not only on the spring constant of the engine mount, but also on the control characteristics of the ACM itself. For example, if the ACM itself becomes elevated in temperature, there is a concern that the driving force of the ACM may decrease more so than at a time of normal temperature. In particular, in the case that a limit is placed on the magnitude of the drive voltage or the drive current of the ACM, since increasing the drive voltage or the drive current and thereby increasing the driving force also is limited, the upper limit of the driving force of the ACM decreases.

The present invention has been devised taking into consideration the aforementioned problems, and an object of the present invention is to provide an active vibration damping device, which is capable of generating a sufficient driving force with an ACM.

The present invention is characterized by an active vibration damping device equipped with first and second engine mounts interposed between a vehicle body and a multi-cylinder internal combustion engine mounted in the vehicle, and which is adapted to suppress vibrations transmitted from a side of the internal combustion engine to a side of the vehicle body, by active vibrations generated by a first actuator of the first engine mount and a second actuator of the second engine mount, comprising a vibration control unit adapted to control the active vibrations generated by the first actuator and the second actuator on the basis of rotation information of the internal combustion engine, wherein the vibration control unit includes a vibration estimating unit adapted to estimate a vibration value of the internal combustion engine on the basis of the rotation information of the internal combustion engine. Further, the vibration control unit executes an amplitude variable-phase fixed control for variably controlling a first amplitude of the active vibration generated by the first actuator, and a second amplitude of the active vibration generated by the second actuator, respectively, according to the rotation information, together with fixedly controlling a first phase of the active vibration generated by the first actuator, and a second phase of the active vibration generated by the second actuator, respectively. Moreover, the vibration control unit changes the first phase and the second phase in mutually opposite directions, in the case that the vibration value estimated by the vibration estimating unit is greater than or equal to a predetermined vibration value.

In the present invention, normally, the amplitude variable-phase fixed control is executed, and in the event that the vibration value of the internal combustion engine becomes greater than or equal to the predetermined vibration value, a first phase of the active vibration generated by the first actuator, and a second phase of the active vibration generated by the second actuator are changed in mutually opposite directions. Upon doing so, it is possible to increase a composite vibration made up of the active vibration generated by the first actuator and the active vibration generated by the second actuator, and thus, it becomes possible for a sufficient driving force to be generated by the ACM.

In the case that the vibration value estimated by the vibration estimating unit is greater than or equal to the predetermined vibration value, the vibration control unit may change the first phase and the second phase to be of substantially the same phase angle. In this case, it becomes possible to further increase the composite vibration made up of the active vibration generated by the first actuator and the active vibration generated by the second actuator.

The vibration control unit may set the first amplitude and the second amplitude to be substantially the same. In this case, it becomes possible to further increase the composite vibration made up of the active vibration generated by the first actuator and the active vibration generated by the second actuator.

The vibration control unit may set the first amplitude to a maximum amplitude capable of being output by the first actuator, and may set the second amplitude to a maximum amplitude capable of being output by the second actuator.

In this case, since it is possible to maximize the composite vibration made up of the active vibration generated by the first actuator and the active vibration generated by the second actuator, a sufficient driving force can be generated by the ACM.

The vehicle body may be constituted to include a main frame and a sub-frame, wherein the engine mount is fixed to the sub-frame. In this case, during the amplitude variable-phase fixed control, the vibration control unit may operate the first engine mount so as to suppress vibrations at a connection point between the first engine mount and the sub-frame, and together therewith, may operate the second engine mount so as to suppress vibrations at a connection point between the second engine mount and the sub-frame, and during the amplitude variable-phase variable control, the vibration control unit may operate the first engine mount and the second engine mount so as to suppress vibrations at a connection point between the sub-frame and the main frame, or vibrations at a connection point between a suspension of the vehicle and the main frame.

According to the present invention, it is possible to increase a composite vibration made up of the active vibration generated by the first actuator and the active vibration generated by the second actuator, and thus, it becomes possible for a sufficient driving force to be generated by the ACM.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4A is a waveform diagram of TDC pulses and CRK pulses, FIG. 4B is a waveform diagram of engine vibrations, and FIG. 4C is a waveform diagram of a current supplied with respect to an ACM solenoid;

DESCRIPTION OF THE PREFERRED EMBODIMENTS

A preferred embodiment of an active vibration damping device according to the present invention will be described in detail below with reference to the accompanying drawings.

1. Vehicle 10

Figure 1:
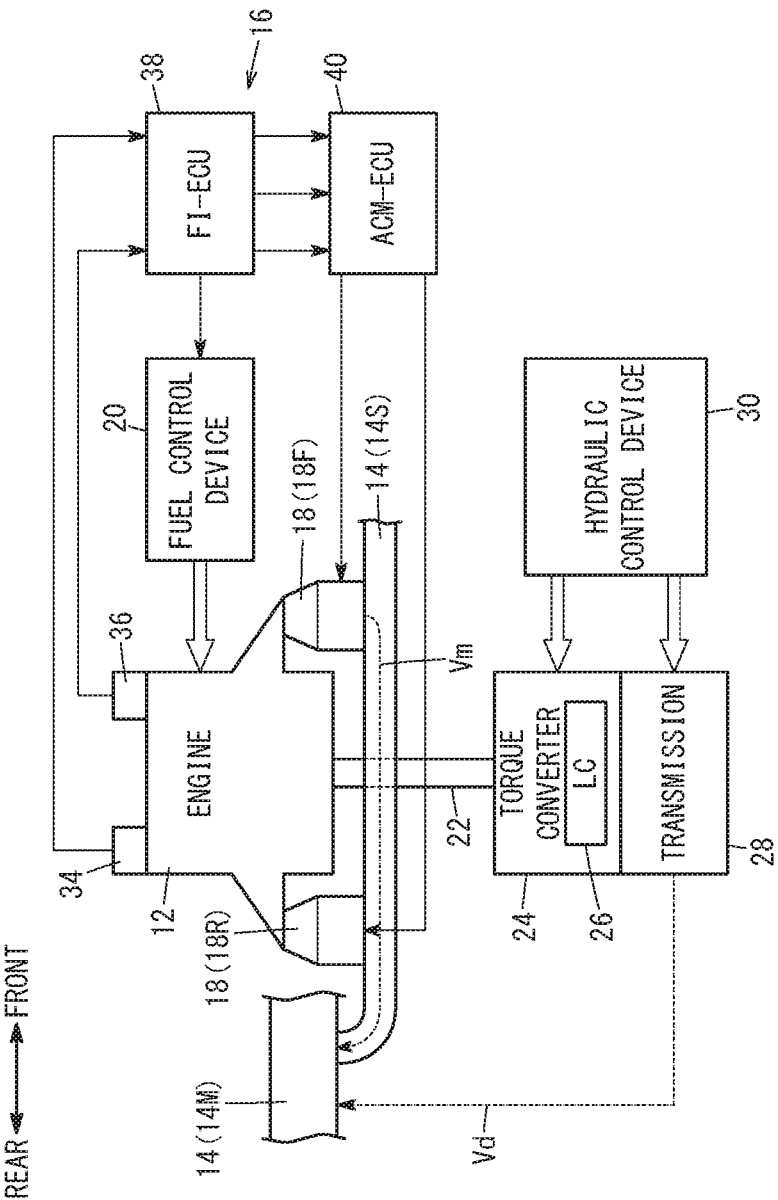
FIG. 1 is a configuration diagram of a vehicle equipped with an active vibration damping device according to a present embodiment.

A vehicle 10 will be described with reference to FIG. 1. The vehicle 10 includes an active vibration damping device 16 which suppresses vibrations that propagate from an engine 12 to a vehicle cabin 10a via (a sub-frame 14S and/or a main frame 14M of) a vehicle body 14. The vehicle 10 is an engine-equipped vehicle in which the engine 12 is mounted as a drive source used for traveling, or a hybrid vehicle in which there is mounted a hybrid power plant including the engine 12 and an electric motor (not shown).

The engine 12 is a multi-cylinder internal combustion engine, which is capable of switching between an all-cylinder operational state and a cylinder paused operational state. The engine 12 is fixed to the sub-frame 14S via a plurality of ACMs (active control mounts) 18. According to the present embodiment, a front-side ACM 18F (hereinafter also referred to as an "ACM-Fr 18F") is disposed on a front part of the engine 12, and a rear-side ACM 18R (hereinafter also referred to as an "ACM-Rr 18R") is disposed on a rear part of the engine 12. Further, apart from the ACMs 18 themselves, other types of mounts may be provided. A mounting system path is formed by a mounting system mechanism of the ACMs 18, and the vehicle body 14. Vibrations Vm of the engine 12 are propagated to the mounting system path.

In the engine 12, fuel supplied from a fuel control device 20 undergoes combustion, and an output shaft 22 of the engine is rotated. The output shaft 22 is connected to the drive wheels (not shown) via a torque converter 24 having a lock-up clutch 26 (hereinafter also referred to as an "LC 26"), a transmission 28, and a drive shaft (not shown). An engagement rate Lr of the LC 26 and a gear stage of the transmission 28 are changed in accordance with a hydraulic oil supplied from a hydraulic control device 30. A suspension (not shown) is interposed between the drive wheels and the vehicle body 14. A drive system path is formed by the vehicle body 14 and a mechanism of the drive system from the output shaft 22 to the suspension. Vibrations Vd of the engine 12 are propagated to the drive system path.

2. Configuration of Active Vibration Damping Device 16

The configuration of the active vibration damping device 16 will be described with reference to FIG. 2. The active vibration damping device 16 includes the ACMs 18, a TDC sensor 34, a CRK sensor 36, a fuel injection ECU 38 (hereinafter referred to as an "FI-ECU 38"), and an ACM-ECU 40.

The ACMs 18 are composed of an ACM-Fr 18F and an ACM-Rr 18R, as described above. For the ACMs 18, devices known in the art, for example, the devices disclosed in Japanese Laid-Open Patent Publication No. 2007-107579 or the like can be used. The ACMs 18 each include a liquid chamber and a linear actuator (neither of which is shown). The actuator includes a stationary element, a movable element, and a solenoid. The movable element is vibrated in accordance with drive signals output from the ACM-ECU 40. In the present specification, vibrations generated by the actuators of the ACMs 18 are referred to as active vibrations. The amplitude, period, and phase of the active vibrations are adjusted in accordance with the periodic oscillation of the engine 12.

The ACM-ECU 40 is a computational device containing a microcomputer, and further includes an input/output unit 42 equipped with an A/D converter, a D/A converter, and various circuitry, etc., a processing unit 44 comprising a CPU, and a storage unit 46 comprising a flash memory, an EEPROM, an SRAM, or the like. The CPU of the processing unit 44 executes various programs, and realizes respective functions, which will be described below in item [3]. The ACM-ECU 40 may be constituted by a single ECU, or may be constituted by a plurality of ECUs.

The TDC sensor 34 detects when the pistons (not shown) of the engine 12 have reached a top dead center position (top dead center timing), and with each detection thereof, generates a TDC pulse, which is output to the FI-ECU 38. In the case that each of the cylinders is operating, an interval between the TDC pulses is indicative of the interval at which the respective cylinders of the engine 12 are located at their top dead center positions, that is, the interval between explosive processes taking place in the cylinders. The CRK sensor 36 detects when the crankshaft (not shown) of the engine 12 has been rotated by a predetermined angle (crank angle), and with each detection thereof, generates a rotary CRK pulse, which is output to the FI-ECU 38. Moreover, the TDC pulses and the CRK pulses may be output directly to the ACM-ECU 40.

The FI-ECU 38 is of the same configuration as the ACM-ECU 40. In addition to the TDC pulses and the CRK pulses, the FI-ECU 38 has input thereto an accelerator pedal operation amount, etc., and outputs a fuel injection command to the fuel control device 20. Further, the FI-ECU 38 outputs the TDC pulses and the CRK pulses with respect to the ACM-ECU 40, together with outputting a cylinder switching signal which indicates switching of the operational state of the engine 12.

3. Controls Implemented by the ACM-ECU 40

Figure 3:
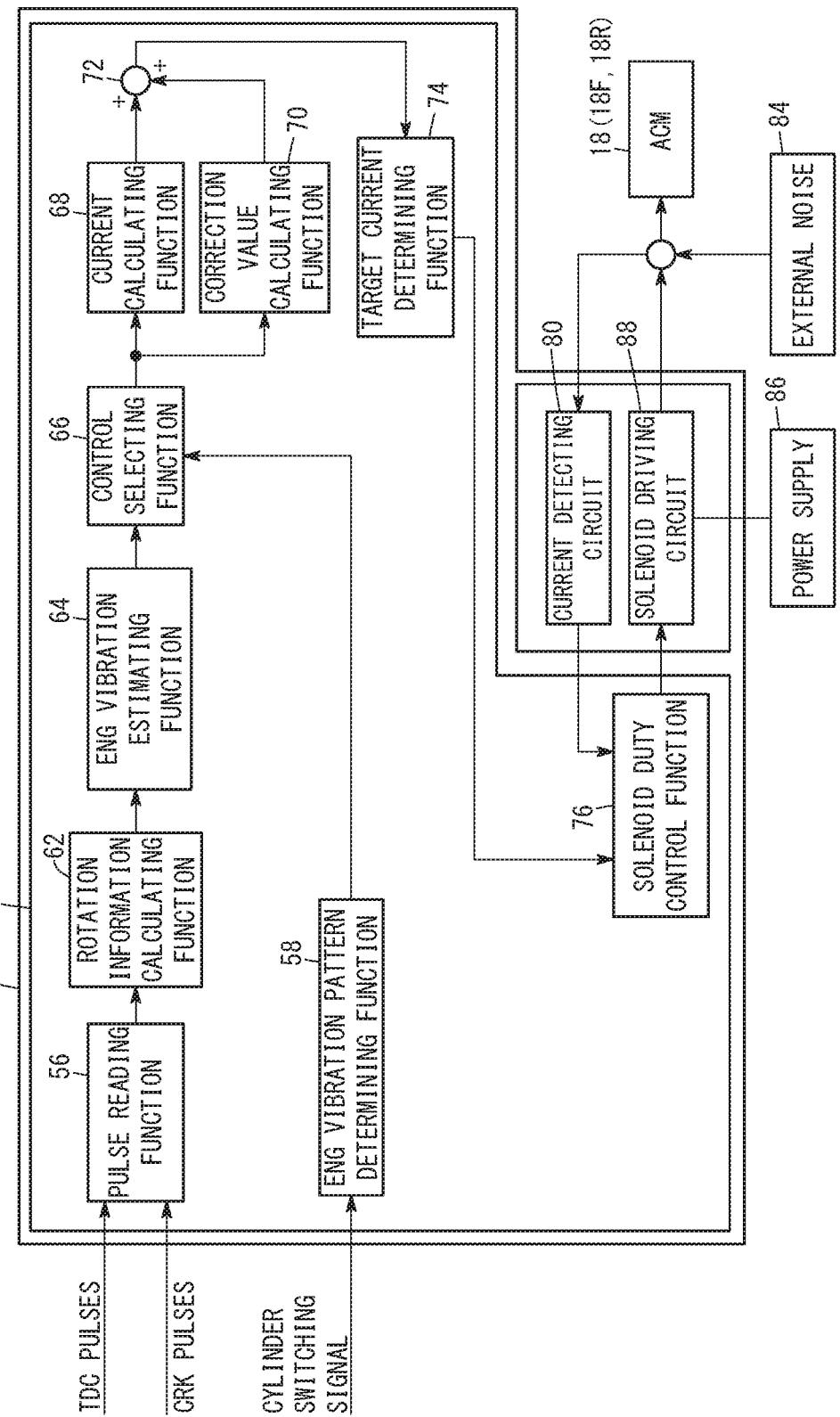
FIG. 3 is a control block diagram of an ACM-ECU employed in the present embodiment.

The controls implemented by the ACM-ECU 40 will be described with reference to FIG. 3. The ACM-ECU 40 obtains the current supplied to energize the ACMs 18 from the processing unit 44, and by the input/output unit 42, outputs drive signals to the ACMs 18. The processing unit 44 executes a feed forward control in consideration of external noise 84, and obtains the current to energize the ACMs 18. The current supplied to the ACMs 18 is stored beforehand in the storage unit 46 as waveform information (a current waveform map 68M and a correction map 70M, to be described later) for canceling out the vibrations of the engine 12 at a predetermined position of the vehicle 10. The processing unit 44 includes the respective functions (a pulse reading function 56 through a solenoid duty control function 76) shown in FIG. 3.

In the pulse reading function 56, the TDC pulses and the CRK pulses output from the FI-ECU 38 are read (see FIG. 4A). In an ENG vibration pattern determining function 58, on the basis of the cylinder switching signal output from the FI-ECU 38, a determination is made as to whether the operational state of the engine 12 is either one of the all-cylinder operational state or the cylinder paused operational state.

In a rotation information calculating function 62, rotation information of the engine 12 is calculated on the basis of the TDC pulses and the CRK pulses, which are read by the pulse reading function 56. In this instance, a period ME and a rotational torque TR are calculated as rotation information of the engine 12. Instead of the period ME, a frequency may be calculated. In the present specification, it is also possible to read the period ME as a rotational speed NE. The period ME is obtained on the basis of the number of TDC pulses or the number of CRK pulses per unit time. On the other hand, the rotational torque TR is obtained in the following manner. Initially, an interval of the CRK pulses is calculated. Next, a crank angular velocity is calculated by dividing a predetermined crank angle by the interval of the CRK pulses, and further, a crank angular acceleration is calculated by differentiating the crank angular velocity over time. In addition, a predetermined inertia about the crankshaft of the engine 12 is multiplied by the crank angular acceleration, to thereby calculate the rotational torque TR about the crankshaft.

In an ENG vibration estimating function 64, an estimated value of the vibration of the engine 12 is calculated. In this instance, a magnitude VAPP (Vibration Amplitude Peak to Peak) of the vibration of the engine 12 is calculated. Hereinafter, the magnitude VAPP of the vibration of the engine 12 will be referred to as a "vibration value VAPP". The vibration value VAPP is obtained from the rotational torque TR, for example. More specifically, a maximum value and a minimum value of the rotational torque TR, which are adjacent to one another in time, are determined, and the difference between the maximum and minimum values is calculated. Such a difference is regarded as the amplitude of the vibrations generated by the engine 12. This amplitude is treated as the vibration value VAPP of the engine 12. As shown in FIG. 4B, since the vibrations of the engine 12 are represented by a waveform, the phase P of such vibrations can also be obtained. For example, with reference to a rising or falling timing of an arbitrary TDC pulse Pr, the phase P is determined as an offset value therefrom up to a timing at which the oscillation value VAPP becomes a minimum value.

Moreover, the vibration value VAPP can also be obtained from the CRK pulses, for example. More specifically, initially, a plurality of the CRK pulses measured within one TDC pulse are plotted in coordinates with the elapsed time being set on the horizontal axis, and a cumulative time (cumulative value between the CRK pulses) as a cumulative value of the time measured between the CRK pulses being set on the vertical axis. Next, in such a plot, a straight line (cumulative time between the average of the CRK pulses) connecting the starting and ending values of the plurality of CRK pulses measured within one TDC pulse is calculated. In addition, a deviation of the cumulative time with respect to the straight line (cumulative time between the average of the CRK pulses) is calculated. Such a deviation consists of the same number of data as the number of CRK pulses measured within one TDC pulse. Finally, the difference between the maximum value and the minimum value of the deviation is set as the vibration value VAPP.

As noted previously, the period ME and the rotational torque TR are calculated as rotation information of the engine 12. However, in view of the fact that the vibration value VAPP takes into account the characteristics of the rotational torque TR, the period ME and the vibration value VAPP may also be calculated as rotation information of the engine 12.

In a control selecting function 66, the control for the ACMs 18 is selected on the basis of the operational state of the engine 12 as determined by the ENG vibration pattern determining function 58, and the vibration value VAPP as calculated by the ENG vibration estimating function 64. More specifically, either one of the amplitude variable-phase fixed control or the amplitude variable-phase variable control is selected.

The amplitude variable-phase fixed control is a control in which the amplitudes (first and second amplitudes of two ACMs 18) of the active vibrations generated by the actuators of the ACMs 18 are variably controlled in accordance with the rotation information (period ME, rotational torque TR (vibration value VAPP)) of the engine 12, together with fixedly controlling (maintaining) the phase of the active vibrations generated by the actuators irrespective of the vibration value VAPP of the engine 12. Further, the amplitude variable-phase variable control is a control in which the amplitudes and the phases (first and second amplitudes and first and second phases of two ACMs 18) of the active vibrations generated by the actuators of the ACMs 18 are both variably controlled in accordance with the rotation information (period ME, rotational torque TR (vibration value VAPP)) of the engine 12. Hereinafter, in order to simplify the description, the amplitude variable-phase fixed control will be referred to simply as a "phase fixed control", and the amplitude variable-phase variable control will be referred to simply as a "phase variable control".

In the control selecting function 66, the phase fixed control is selected in the case that the operational state of the engine 12 is the all-cylinder operational state, and the phase variable control is selected in the case that the operational state of the engine 12 is the cylinder paused operational state. In the event that the vibration value VAPP is greater than or equal to a predetermined vibration value VAPP_th, the phase variable control is executed.

In a current calculating function 68, a waveform of the current that is supplied to energize the ACMs 18 is obtained on the basis of the rotation information of the engine 12. The process of the current calculating function 68 is performed regardless of which of the phase fixed control or the phase variable control is selected by the control selecting function 66. An example of the process performed in the current calculating function 68 will be described below.

Figure 2:
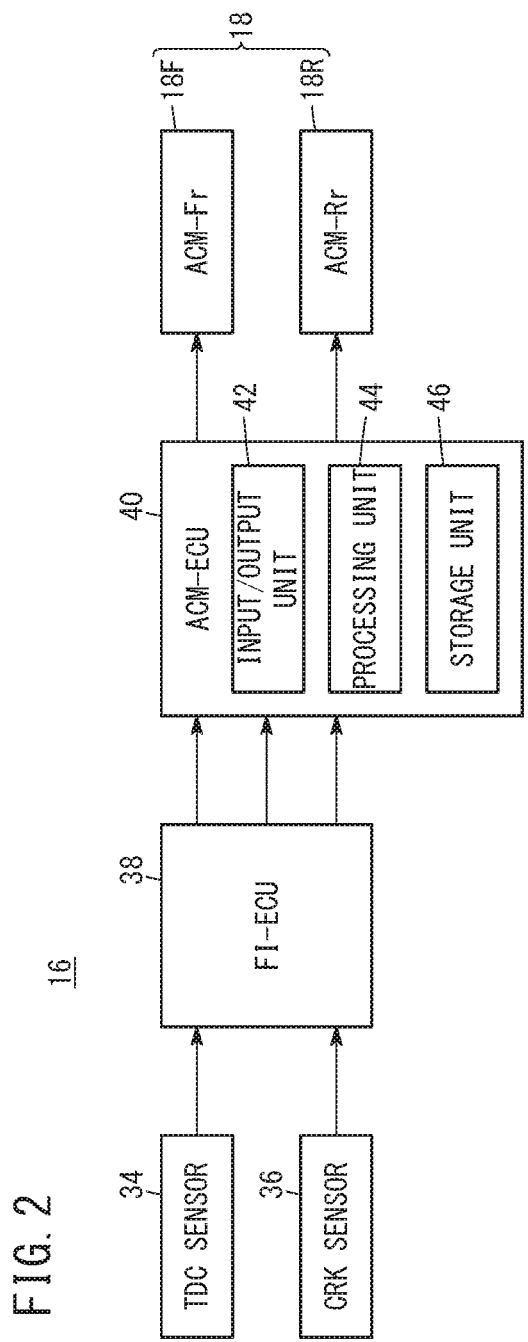
FIG. 2 is a functional block diagram of the active vibration damping device according to the present embodiment.

The current waveform map 68M (see FIG. 5A), in which the current waveform information of the ACMs 18 is associated with the rotation information of the engine 12, is stored in the storage unit 46 (see FIG. 2). The current waveform information is information concerning the current to be supplied to the ACMs 18 for the purpose of damping vibrations at the first position in the vehicle 10, and includes information in relation to the amplitude A, the period T, and the phase P thereof. The current waveform corresponds to the waveform of the vibrations generated by the ACMs 18. The first position corresponds to an evaluation point in the case of performing the phase fixed control. In the present embodiment, the first position is a connection point between the ACMs 18 and the sub-frame 14S. The phase P included in the current waveform information is a phase for a case in which a vibration waveform of the engine 12 is taken as a reference.

A current waveform map 68M is set for each of the ACMs 18. In the individual current waveform maps 68M, current waveform information for suppressing the vibration of the engine 12 at the first position by way of a cooperative control of the respective ACMs 18 is set in association with the rotation information of the engine 12. Moreover, the current waveform information for each of the ACMs 18 may be set collectively at respective addresses of one current waveform map 68M.

Figure 5A:
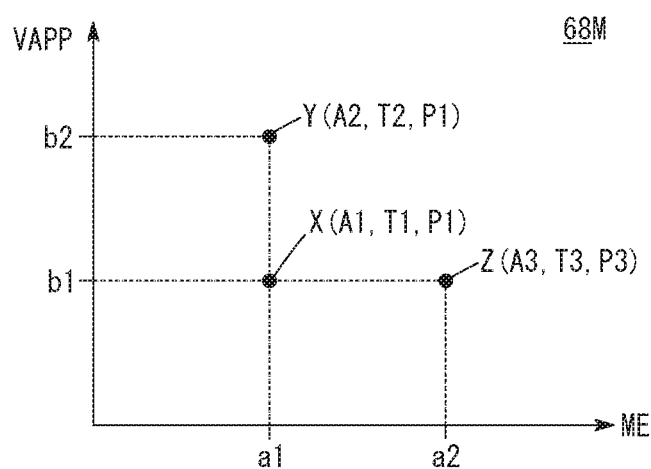
FIG. 5A is a diagram showing a current waveform map.

In the current waveform map 68M shown in FIG. 5A, the current waveform information is linked to an address specified by the period ME (horizontal axis) and the vibration value VAPP (vertical axis). For example, as shown in FIG. 5A, the current waveform information of (amplitude A1, period T1, phase P1) is linked to the address X specified by ME=a1 and VAPP=b1. Further, the current waveform information of (amplitude A2, period T2, phase P1) is linked to the address Y specified by ME=a1 and VAPP=b2. Further, the current waveform information of (amplitude A3, period T3, phase P3) is linked to the address Z specified by ME=a2 and VAPP=b1.

In this manner, in the current waveform map 68M, individual values corresponding to a period ME and a vibration value VAPP are set as the amplitude A and the period T of the current waveform. Also, as the phase P of the current waveform, a value is set that corresponds to the period ME, but is not dependent on the vibration value VAPP. Therefore, in a situation in which the vibration value VAPP varies without any change to the period ME, the amplitude A and the period T obtained from the current waveform map 68M are of different values, whereas the phase P is maintained at the same value.

In a correction value calculating function 70, a correction value for the waveform of the current supplied to energize the ACMs 18 is obtained on the basis of the rotation information of the engine 12. The process of the correction value calculating function 70 is performed in the case that the phase variable control is selected and the phase variable control is not prohibited by the control selecting function 66. An example of the process performed in the correction value calculating function 70 will be described below.

A correction map 70M (see FIG. 5B), in which correction information of the current waveform information of the ACMs 18 is associated with the rotation information of the engine 12, is stored in the storage unit 46 (see FIG. 2). The correction information is information concerning correction values of the current supplied to energize the ACMs 18, for the purpose of damping or suppressing vibrations at the second position in the vehicle 10, and includes information in relation to the amplitude A and the phase P. The second position corresponds to an evaluation point in the case of performing the phase variable control. In the present embodiment, the second position is a connection point between the sub-frame 14S and the main frame 14M, or a connection point between the suspension and the main frame 14M. The first position and the second position may both be the same position.

A correction map 70M is set for each of the ACMs 18. In the individual correction maps 70M, correction information for suppressing the vibration of the engine 12 at the second position by way of a cooperative control of the respective ACMs 18 is set in association with the rotation information of the engine 12. Moreover, the correction information for each of the ACMs 18 may be set collectively at respective addresses of one correction map 70M.

Figure 5B:
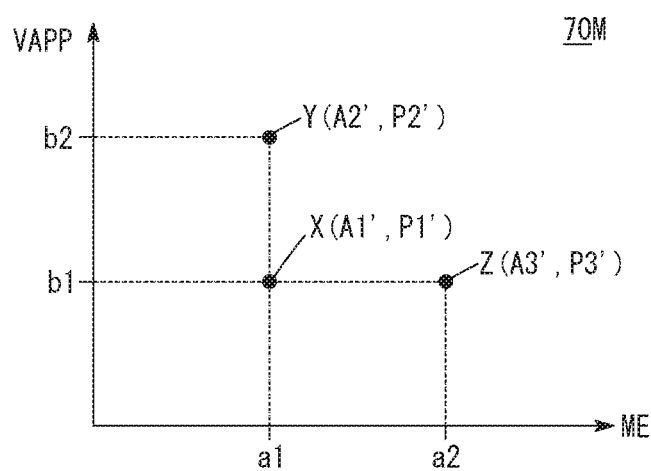
FIG. 5B is a diagram showing a correction map.

In the correction map 70M shown in FIG. 5B, correction information is linked to an address specified by the period ME (horizontal axis) and the vibration value VAPP (vertical axis). For example, as shown in FIG. 5B, the correction information of (amplitude A1', phase P1') is linked to the address X specified by ME=a1 and VAPP=b1. Further, the correction information of (amplitude A2', phase P2') is linked to the address Y specified by ME=a1 and VAPP=b2. Further, the correction information of (amplitude A3', phase P3') is linked to the address Z specified by ME=a2 and VAPP=b1.

In this manner, in the correction map 70M, individual values corresponding to a period ME and a vibration value VAPP are set as correction values of the amplitude A and the phase P of the current waveform. Therefore, in a situation in which the period ME and/or the vibration value VAPP changes, the correction value of the amplitude A and the correction value of the phase P obtained from the correction map 70M are of different values.

Correction information for the phases P, which are set to the same address in the correction map 70M of the ACM-Fr 18F and in the correction map 70M of the ACM-Rr 18R, are set in such a manner that the correction directions for the phases P are mutually opposite to each other. Therefore, in the case that the current waveform information obtained by the current waveform map 68M is corrected by the correction information obtained by the correction map 70M, then the phase P of the current waveform supplied to energize the ACM-Fr 18F, and the phase P of the current waveform supplied to energize the ACM-Rr 18R are corrected in mutually opposite directions (an advancing direction and a delayed direction). More specifically, the first phase of the active vibration generated by the ACM-Rr 18F, and the second phase of the active vibration generated by the ACM-Rr 18R are corrected in mutually opposite directions (an advancing direction and a delayed direction). According to the present embodiment, the first phase and the second phase are corrected so as to approach mutually toward one another. Moreover, the angle of correction (phase angle) of the first phase, and the angle of correction (phase angle) of the second phase may be different, however, according to the present embodiment, the angle of correction (phase angle) of the first phase, and the angle of correction (phase angle) of the second phase are set substantially equivalent to each other.

Further, the amplitude A of the current waveforms supplied to energize the ACM-Fr 18F and the ACM-Rr 18R may be set to a maximum value defined by a rated value, for example. More specifically, the amplitudes (first amplitude, second amplitude) of the active vibrations generated by the ACM-Fr 18F and the ACM-Rr 18R may be set to a maximum value lying within a range that is capable of being output thereby.

Correction information for the amplitudes A, which are set to the same address in the correction map 70M of the ACM-Fr 18F and in the correction map 70M of the ACM-Rr 18R, may be mutually the same. In this case, the amplitudes (the first amplitude and the second amplitude) of the active vibrations generated by the ACM-Fr 18F and the ACM-Rr 18R are mutually equivalent to each other.

In an adding function 72, the correction values of the amplitude A and the phase P obtained by the correction value calculating function 70 are added to the amplitude A and the phase P of the currents for the ACMs 18 obtained by the current calculating function 68. In the case that the phase fixed control is selected by the control selecting function 66, since correction information is not output by the correction value calculating function 70, the current waveform information of the current calculating function 68 is output without modification from the adding function 72. Stated otherwise, it is possible for the phase fixed control to be executed. On the other hand, in the case that the phase variable control is selected by the control selecting function 66, since the correction information is output by the correction value calculating function 70, the current waveform information of the current calculating function 68 is corrected by the correction information of the correction value calculating function 70, and then output from the adding function 72. Stated otherwise, it is possible for the phase variable control to be executed.

In a target current determining function 74, the amplitude A, the period T, and the phase P of the current waveform information, which were calculated by the adding function 72, are determined as target values for the amplitude A, the period T, and the phase P of the currents supplied to energize the solenoids of the ACMs 18 (see FIG. 4C).

In a solenoid duty control function 76, a duty ratio for realizing the currents to be supplied to the solenoids is determined on the basis of the amplitude A, the period T, and the phase P of the currents determined by the target current determining function 74. At this time, a feedback control, for example a PID control, is performed on the basis of the actual currents of the ACMs 18 detected by a current detecting circuit 80.

A solenoid drive circuit 88 included in the input/output unit 42 is connected to a power supply 86, and outputs drive signals to the ACMs 18 on the basis of the duty ratio obtained from the solenoid duty control function 76.

4. Process Flow of ACM-ECU 40

Figure 6:
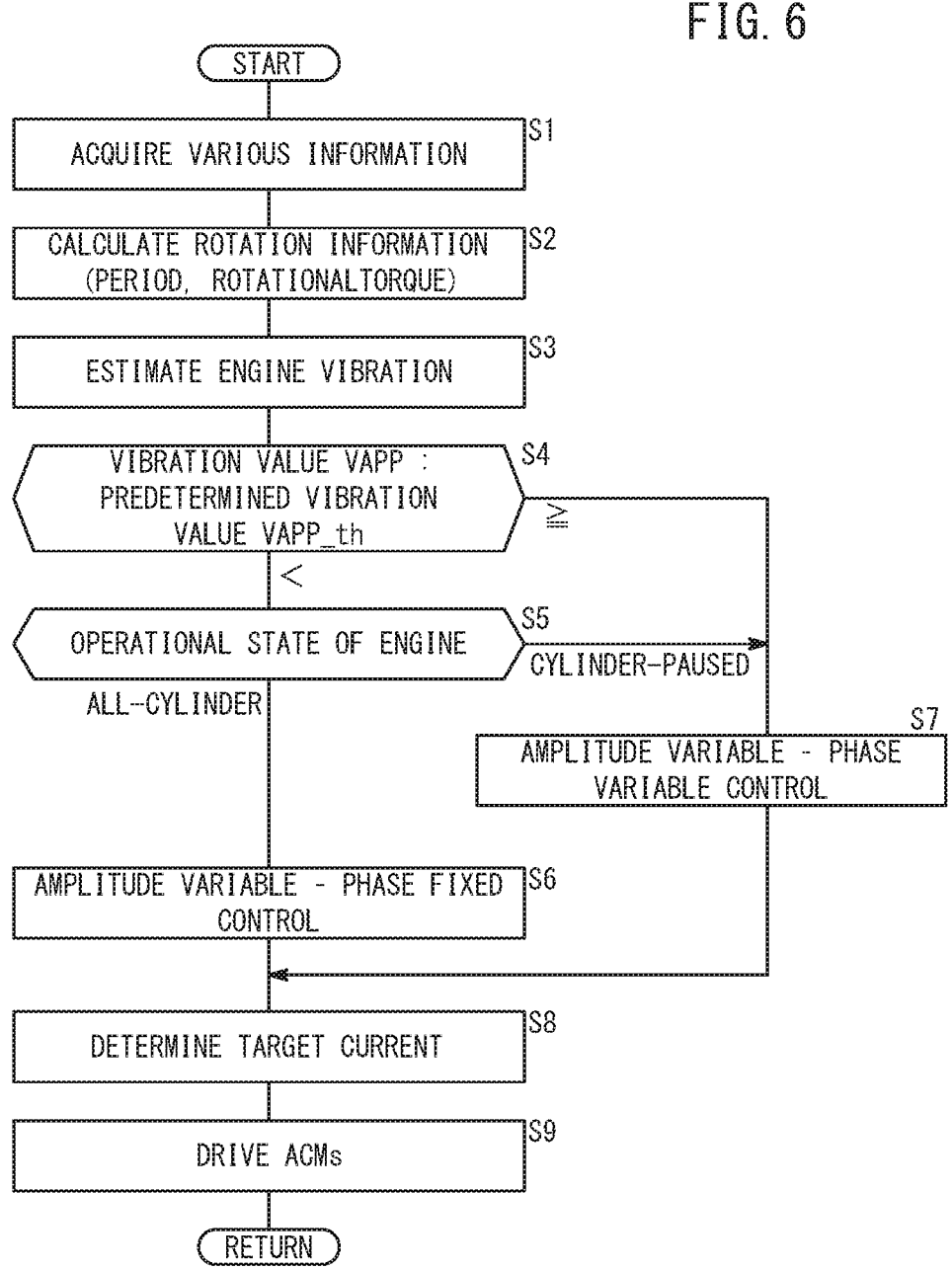
FIG. 6 is a flowchart of processes that are executed according to the present embodiment.

A series of processes executed by the ACM-ECU 40 will be described with reference to FIG. 6. FIG. 6 shows the series of control blocks shown in FIG. 3 in the form of a process flow. The ACM-ECU 40 repeatedly executes the processes described below at extremely short time intervals.

In step S1, various information, in this instance, the TDC pulses, the CRK pulses, and cylinder switching signals and the like are acquired. In step S2, the rotation information (the period ME and the rotational torque TR) of the engine 12 is calculated on the basis of the TDC pulses and the CRK pulses.

In step S3, the vibration of the engine 12 is estimated. According to the present embodiment, the vibration value VAPP is calculated. In step S4, a comparison is made between the vibration value VAPP and the predetermined vibration value VAPP_th stored in the storage unit 46. In the case that the vibration value VAPP is less than the predetermined vibration value VAPP_th (step S4: ≤), the process transitions to step S5. However, in the case that the vibration value VAPP is greater than or equal to the predetermined vibration value VAPP_th (step S4: the process transitions to step S7.

In the case that a transition is made from step S4 to step S5, the operational state of the engine 12 is determined. In the case of the all-cylinder operational state (step S5: all-cylinder), the process transitions to step S6. On the other hand, in the case of the cylinder paused operational state (step S5: cylinder paused), the process transitions to step S7.

In the case that a transition is made from step S5 to step S6, the phase fixed control is executed. In this instance, the waveform (the amplitude A, the period T, and the phase P) of the current supplied to energize the ACMs 18 is determined on the basis of the period ME calculated in step S2 and the vibration value VAPP calculated in step S3. More specifically, as described above in item [3], the current waveform (the amplitude A, the period T, and the phase P) is obtained using the current waveform map 68M shown in FIG. 5A. In accordance with the current waveform map 68M, as long as the period ME of the engine 12 does not change, the same phase P is obtained for each of the calculations. Stated otherwise, the phase P is fixed (maintained).

In the case that a transition is made from step S4 or step S5 to step S7, the phase variable control is executed. In this instance, the waveform (the amplitude A, the period T, and the phase P) of the current supplied to energize the ACMs 18 is determined on the basis of the period ME calculated in step S2 and the vibration value VAPP calculated in step S3. More specifically, as described above in item [3], the current waveform (the amplitude A, the period T, and the phase P) is obtained using the current waveform map 68M shown in FIG. 5A, and further, the correction value therefor (the amplitude A and the phase P) is obtained using the correction map 70M shown in FIG. 5B. Then, the current waveform is corrected using the correction value.

In step S8, the target current is determined on the basis of the current waveform obtained in step S6 or step S7. In step S9, the ACMs 18 are driven on the basis of the target current determined in step S8.

5. Switching Between Phase Fixed Control and Phase Variable Control

The processing unit 44 of the ACM-ECU 40 sets a first time interval, which is required for switching from the phase fixed control to the phase variable control, not to be equal to a second time interval, which is required for switching from the phase variable control to the phase fixed control. According to the present embodiment, the first time interval is set to be longer than the second time interval.

For example, at a time of switching the controls, the correction value calculating function 70 multiplies the correction value (the amplitude A, the phase P) obtained using the correction map 70M by a coefficient that varies from 0 to 1. At this time, and more specifically, at a time of switching from the phase fixed control to the phase variable control, the coefficient is gradually increased (from 0 to 1) together with the elapse of time, and at a time of switching from the phase variable control to the phase fixed control, the coefficient is gradually decreased (from 1 to 0) together with the elapse of time. The first time interval can be set to be longer than the second time interval by decreasing the rate at which the coefficient is changed when switching from the phase fixed control to the phase variable control, and by increasing the rate at which the coefficient is changed when switching from the phase variable control to the phase fixed control.

Comparing the phase fixed control and the phase variable control, the phase fixed control tends to be more stable. In such a case, if switching is carried out quickly from the phase fixed control to the phase variable control, there is a concern that the control may become unstable. Therefore, by making the first time interval longer than the second time interval and thereby gradually switching between the controls, it is possible to prevent the control from becoming unstable. Further, by making the second time interval shorter than the first time interval, switching between the controls can be performed quickly.

6. Operations and Effects of Phase Fixed Control and Phase Variable Control

Figure 7A:
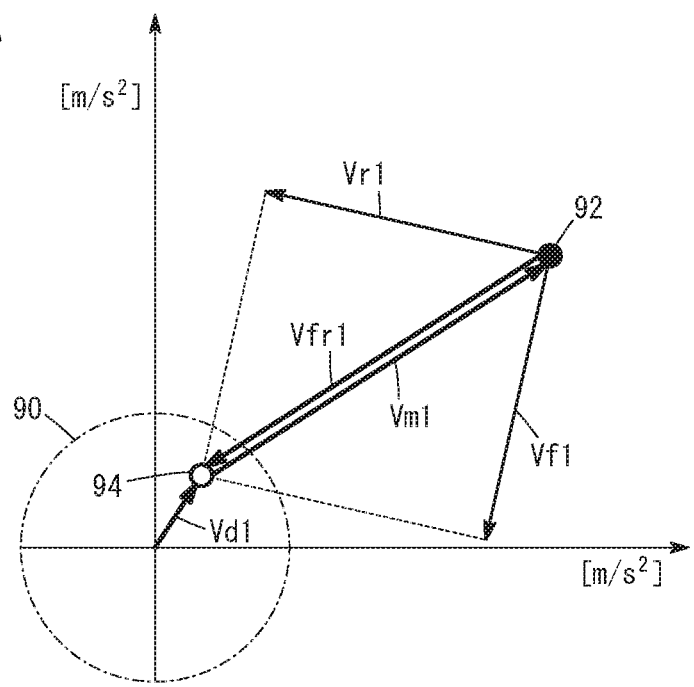
FIG. 7A is a vector diagram for explaining operations and effects of a phase fixed control.
Figure 7B:
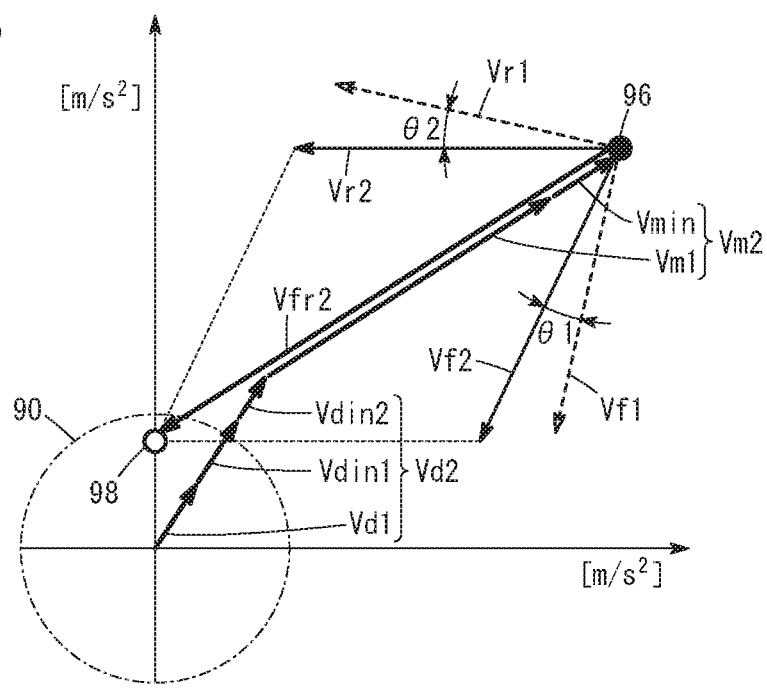
FIG. 7B is a vector diagram for explaining operations and effects of a phase variable control.

Operations and effects of the active vibration damping device 16 will be described with reference to FIGS. 7A and 7B. FIGS. 7A and 7B are vector diagrams showing a magnitude and phase of the respective vibrational components that propagate to the evaluation point set within the vehicle 10. In the present embodiment, as the evaluation point, the aforementioned second position is used which is a connection point between the sub-frame 14S and the main frame 14M, or a connection point between the suspension and the main frame 14M. In FIGS. 7A and 7B, the length of the vector is indicative of the magnitude (in units of $[m/s^2]$) of a driving force generated by each of the respective vibrations, and the angle of the vector (an angle of rotation in a positive direction, i.e., a counterclockwise direction, with reference to a positive direction of the horizontal axis) is indicative of the phase, taking the vibration of the engine 12 as a reference. Further, in FIGS. 7A and 7B, the circular shaped allowable range 90 is indicative of an allowable range for the driving force.

With reference to FIG. 7A, a description will be presented of the operations and effects of the phase fixed control, which is implemented in the event that the operational state of the engine 12 is the all-cylinder operational state, and the engagement rate Lr of the LC 26 is not 100% (roughly 96% to 97%). In the case of the all-cylinder operational state, and if the engagement rate Lr of the LC 26 is not 100%, the vibration Vd1 of the engine 12 propagates through the drive system path to the evaluation point, whereas the vibration Vm1 of the engine 12 propagates through the mounting system path. As indicated at point 92 in FIG. 7A, in accordance with the vibration Vd1 and the vibration Vm1, the driving force of the vibrations at the evaluation point falls outside of the allowable range 90.

When the phase fixed control is executed using the current waveform map 68M (see FIG. 5A), the vibration Vf1 of the ACM-Fr 18F and the vibration Vr1 of the ACM-Rr 18R propagate to the evaluation point through the mounting system path. At this time, the phase of the vibration Vf1 and the phase of the vibration Vr1 are controlled on the basis of the vibration of the engine 12 so as to remain constant. In this instance, the phase of the vibration Vf1 is controlled so as to be delayed by roughly 90 degrees from the phase of the vibration Vr1. As shown at point 94 in FIG. 7A, the vibrations transmitted from the engine 12 are canceled out by the composite vibration Vfr1 made up of the vibration Vf1 and the vibration Vr1, and thus, the magnitude of the vibrations at the evaluation point can be made to reside within the allowable range 90.

With reference to FIG. 7B, a description will be presented of the operations and effects of the phase variable control, which is implemented in the event that the operational state of the engine 12 is the cylinder paused operational state, and the engagement rate Lr of the LC 26 is roughly 100%. While the period ME of the engine 12 remains constant, the engine 12 is switched from the all-cylinder operational state to the cylinder paused operational state, and further, the engagement rate Lr of the LC 26 becomes 100%. At this time, the vibration Vd2 of the engine 12 propagates through the drive system path to the evaluation point, whereas the vibration Vm2 of the engine 12 propagates through the mounting system path. The vibration Vd2 is made up of a combination of a vibration Vd1 shown in FIG. 7A, a vibration Vdin1, which is increased in accordance with the cylinder paused operational state, and a vibration Vdin2, which is increased as a result of the engagement rate Lr of the LC 26 becoming 100%. Further, the vibration Vm2 is made up of a combination of the vibration Vm1 shown in FIG. 7A and a vibration Vmin, which is increased in accordance with the cylinder paused operational state. As indicated at point 96 in FIG. 7B, in accordance with the vibration Vd2 and the vibration Vm2, the magnitude of the vibrations at the evaluation point falls outside of the allowable range 90. The vibrations generated at this time become larger than the vibrations (at point 92) generated during the all-cylinder operational state.

When the phase variable control is executed using the current waveform map 68M (see FIG. 5A) and the correction map 70M (see FIG. 5B), the vibration Vf2 of the ACM-Fr 18F and the vibration Vr2 of the ACM-Rr 18R propagate to the evaluation point through the mounting system path. In comparison with the vibration Vf1 shown in FIG. 7A, the vibration Vf2 changes in a direction (the clockwise direction in the drawing) in which the driving force becomes larger, and the phase is delayed by the phase angle θ1 [deg]. Further, in comparison with the vibration Vr1 shown in FIG. 7A, the vibration Vr2 changes in a direction (the counterclockwise direction in the drawing) in which the driving force becomes larger, and the phase is advanced by the phase angle θ2 [deg].

According to the present embodiment, the phase variable control is carried out in order to control the currents supplied to energize the ACM-Fr 18F and the ACM-Rr 18R, and the phase of the vibration Vf2 and the phase of the vibration Vr2 are made to change mutually in opposite directions (an advancing direction and a delayed direction). Upon doing so, the composite vector made up of the vibration Vf2 and the vibration Vr2 becomes larger. Stated otherwise, in accordance with the phase variable control, the driving force of the vibrations that propagate to the evaluation point as a result of driving the ACMs 18 can be made larger than during the phase fixed control. As shown at point 98 in FIG. 7B, the vibrations transmitted from the engine 12 are canceled out by the composite vibration Vfr2 made up of the vibration Vf2 and the vibration Vr2, and thus, the magnitude of the vibrations at the evaluation point can be made to reside within the allowable range 90.

As shown in FIG. 7B, the driving force of the vibration Vf2 and the driving force of the vibration Vr2 are substantially the same, and further, the phase angle θ1 and the phase angle θ2 are substantially the same. By setting the phase angle θ1 and the phase angle θ2 to be substantially equivalent, it is possible to increase the driving force of the composite vibration Vfr2. However, the driving force of the vibration Vf2 and the driving force of the vibration Vr2 may differ, or the phase angle θ1 and the phase angle θ2 may differ from each other. In essence, the driving force of the vibration Vf2 and the driving force of the vibration Vr2, as well as the phase angle θ1 and the phase angle θ2, may be of any value, insofar as the driving force of the vibrations at the evaluation point can be returned from the point 96 to a point lying within the allowable range 90.

Moreover, if the current supplied to energize the respective ACMs 18 is made to increase to a rated value, the amplitude of the vibrations output from each of the ACMs 18 can be maximized. As a result, by driving the ACMs 18, it is possible to maximize the driving force of the vibrations propagated therefrom to the evaluation point.

7. Modifications

The phase variable control of the present embodiment is a control for correcting the current waveform map 68M (see FIG. 5A) using the correction map 70M (see FIG. 5B). Instead of such a control, the phase fixed control and the phase variable control may be executed using respective independent current waveform maps.

According to the present embodiment, the current waveform map 68M (see FIG. 5A) is used in which current waveform information (the amplitude A, the period T, the phase P) is linked to each of respective addresses. Instead of this feature, a plurality of maps in which individual information is associated with each of the respective addresses may be used. For example, a current amplitude map in which information of the amplitude A and the period T of the current waveform is linked to each of the respective addresses, and a current phase map in which information of the phase P of the current waveform is linked to each of the respective addresses may be used. Further, according to the present embodiment, a correction map 70M (see FIG. 5B) is used in which correction information of the amplitude A and the phase P of the current waveform is linked with each of the respective addresses. Instead of this feature, a plurality of maps in which individual information is associated with each of the respective addresses may be used. For example, a current amplitude correction map in which correction information of the amplitude A of the current waveform is linked to each of the respective addresses, and a phase correction map in which correction information of the phase P of the current waveform is linked to each of the respective addresses may be used.

8. Summary of the Embodiment

The present embodiment relates to the active vibration damping device 16, which is equipped with the ACM-Fr 18F and the ACM-Rr 18R (first and second engine mounts) interposed between the vehicle body 14 and the multi-cylinder engine 12 (internal combustion engine) mounted in the vehicle 10, and is adapted to suppress vibrations transmitted from a side of the engine 12 to a side of the vehicle body 14, by active vibrations generated by the first actuator of the ACM-Fr 18F and the second actuator of the ACM-Rr 18R. The active vibration damping device 16 is equipped with the ACM-ECU 40 (vibration control unit) that controls active vibrations generated by the first actuator and the second actuator on the basis of the rotation information of the engine 12. The ACM-ECU 40 includes the ENG vibration estimating function 64 (vibration estimating unit) which estimates the vibration value VAPP of the engine 12 on the basis of the rotation information of the engine 12. In addition, the active vibration damping device 16 executes the phase fixed control for variably controlling the first amplitude of the active vibration generated by the first actuator, and the second amplitude of the active vibration generated by the second actuator, respectively, according to the rotation information, together with fixedly controlling the first phase of the active vibration generated by the first actuator, and the second phase of the active vibration generated by the second actuator, respectively. Further, the active vibration damping device 16 changes the first phase and the second phase in mutually opposite directions, in the case that the vibration value VAPP estimated by the ENG vibration estimating function 64 is greater than or equal to the predetermined vibration value VAPP_th.

In the present embodiment, normally, the phase fixed control is executed, and in the event that the vibration value VAPP of the engine 12 becomes greater than or equal to the predetermined vibration value VAPP_th, the first phase of the active vibration generated by the first actuator, and the second phase of the active vibration generated by the second actuator are changed in mutually opposite directions. Upon doing so, it is possible to increase the composite vibration made up of the active vibration generated by the first actuator and the active vibration generated by the second actuator, and thus, it becomes possible for a sufficient driving force to be generated by the ACM-Fr 18F and the ACM-Rr 18R.

In the case that the vibration value VAPP estimated by the ENG vibration estimating function 64 is greater than or equal to the predetermined vibration value VAPP_th, the AMC-ECU 40 changes the first phase and the second phase by substantially the same phase angle. In this case, it becomes possible to further increase the composite vibration made up of the active vibration generated by the first actuator and the active vibration generated by the second actuator.

The AMC-ECU 40 sets the first amplitude and the second amplitude to be substantially the same. In this case, it becomes possible to further increase the composite vibration made up of the active vibration generated by the first actuator and the active vibration generated by the second actuator.

The AMC-ECU 40 sets the first amplitude to a maximum amplitude capable of being output by the first actuator, and sets the second amplitude to a maximum amplitude capable of being output by the second actuator.

In this case, since it is possible to maximize the composite vibration made up of the active vibration generated by the first actuator and the active vibration generated by the second actuator, a sufficient driving force can be generated by the ACM-Fr 18F and the ACM-Rr 18R.

It is a matter of course that the active vibration damping device 16 according to the present invention is not limited to the embodiment described above, and various additional or modified configurations could be adopted therein without departing from the essence and gist of the present invention.

What is claimed is:

1. An active vibration damping device comprising first and second engine mounts interposed between a vehicle body and a multi-cylinder internal combustion engine mounted in the vehicle, and which is configured to suppress vibrations transmitted from a side of the internal combustion engine to a side of the vehicle body, by active vibrations generated by a first actuator of the first engine mount and a second actuator of the second engine mount, comprising:
   a vibration control unit configured to control the active vibrations generated by the first actuator and the second actuator on basis of rotation information of the internal combustion engine;
   wherein the vibration control unit:
   includes a vibration estimating unit configured to estimate a vibration value of the internal combustion engine on basis of the rotation information of the internal combustion engine;
   executes an amplitude variable-phase fixed control for variably controlling a first amplitude of the active vibration generated by the first actuator, and a second amplitude of the active vibration generated by the second actuator, respectively, according to the rotation information, together with fixedly controlling a first phase of the active vibration generated by the first actuator, and a second phase of the active vibration generated by the second actuator, respectively; and
   changes the first phase and the second phase in mutually opposite directions, in the case that the vibration value estimated by the vibration estimating unit is greater than or equal to a predetermined vibration value.

2. The active vibration damping device according to claim 1, wherein, in the case that the vibration value estimated by the vibration estimating unit is greater than or equal to the predetermined vibration value, the vibration control unit changes the first phase and the second phase by substantially the same phase angle.

3. The active vibration damping device according to claim 1, wherein the vibration control unit sets the first amplitude and the second amplitude to be substantially the same.

4. The active vibration damping device according to claim 1, wherein the vibration control unit:
   sets the first amplitude to a maximum amplitude capable of being output by the first actuator; and
   sets the second amplitude to a maximum amplitude capable of being output by the second actuator.

5. The active vibration damping device according to claim 1, wherein:
   the vehicle body is constituted to include a main frame and a sub-frame;
   the first engine mount and the second engine mount are fixed to the sub-frame; and
   the vibration control unit:
   during the amplitude variable-phase fixed control, operates the first engine mount so as to suppress vibrations at a connection point between the first engine mount and the sub-frame, and together therewith, operates the second engine mount so as to suppress vibrations at a connection point between the second engine mount and the sub-frame; and
   during the amplitude variable-phase variable control, operates the first engine mount and the second engine mount so as to suppress vibrations at a connection point between the sub-frame and the main frame, or vibrations at a connection point between a suspension of the vehicle and the main frame.

* * * * *